United States Patent
Sultana et al.

(10) Patent No.: US 10,372,902 B2
(45) Date of Patent: Aug. 6, 2019

(54) CONTROL FLOW INTEGRITY

(71) Applicant: Intel Corporation, Santa Clara, CA (US)

(72) Inventors: Salmin Sultana, Hillsboro, OR (US); Ravi L. Sahita, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 166 days.

(21) Appl. No.: 15/450,931

(22) Filed: Mar. 6, 2017

(65) Prior Publication Data

US 2018/0253547 A1    Sep. 6, 2018

(51) Int. Cl.
G06F 11/36    (2006.01)
G06F 21/52    (2013.01)

(52) U.S. Cl.
CPC .............. *G06F 21/52* (2013.01); *G06F 11/36* (2013.01); *G06F 2221/033* (2013.01)

(58) Field of Classification Search
CPC ..... G06F 21/52; G06F 11/36; G06F 2221/033
See application file for complete search history.

(56) References Cited

U.S. PATENT DOCUMENTS

| 8,782,435 | B1 | 7/2014 | Ghose | |
|---|---|---|---|---|
| 9,262,163 | B2 | 2/2016 | Kurts et al. | |
| 9,569,613 | B2 | 2/2017 | Yamada et al. | |
| 2008/0034350 | A1 | 2/2008 | Conti | |
| 2010/0192026 | A1* | 7/2010 | Abadi | G06F 11/08 714/53 |
| 2012/0331278 | A1* | 12/2012 | Breternitz | G06F 9/5027 712/236 |
| 2013/0024676 | A1* | 1/2013 | Glew | G06F 9/30076 712/244 |
| 2013/0055221 | A1 | 2/2013 | Murthy et al. | |

(Continued)

FOREIGN PATENT DOCUMENTS

WO    2009-156198 A1    12/2009

OTHER PUBLICATIONS

Liu, Yutao et al., "Transparent and Efficient CFI Enforcement with Intel Processor Trace", 2017 IEEE International Symposium on High Performance Computer Architecture, Feb. 4-8, 2017, pp. 529-540. (Year: 2017).*

(Continued)

*Primary Examiner* — Michael Pyzocha
(74) *Attorney, Agent, or Firm* — Grossman, Tucker, Perreault & Pfleger, PLLC

(57) ABSTRACT

One embodiment provides an accelerator circuitry. The accelerator circuitry includes accelerator processor circuitry; accelerator memory circuitry; processor trace (PT) decoder circuitry and control flow integrity (CFI) checker circuitry. The PT decoder circuitry is to at least one of receive and/or retrieve PT data from a host device. The PT decoder circuitry is further to extract a target instruction pointer (TIP) packet from the PT data and to decode the TIP packet to yield a runtime target address. The CFI checker circuitry is to determine, at runtime, whether a control flow transfer of an indirect branch instruction to the runtime target address corresponds to a control flow violation based, at least in part, on control flow (CF) information (info) stored to an accelerator CF info store.

22 Claims, 3 Drawing Sheets

(56) References Cited

U.S. PATENT DOCUMENTS

| | | | |
|---|---|---|---|
| 2014/0082327 A1* | 3/2014 | Ghose | G06F 9/3877 |
| | | | 712/205 |
| 2014/0189314 A1 | 7/2014 | Kurts et al. | |
| 2015/0095878 A1 | 4/2015 | Zhang et al. | |
| 2015/0106604 A1 | 4/2015 | Greathouse et al. | |
| 2016/0110542 A1* | 4/2016 | Shanbhogue | G06F 21/52 |
| | | | 726/23 |
| 2016/0117171 A1 | 4/2016 | Kurts et al. | |
| 2016/0210216 A1* | 7/2016 | Monahan | G06F 11/3604 |
| 2016/0259644 A1* | 9/2016 | Brandt | G06F 9/30189 |
| 2016/0283712 A1* | 9/2016 | Kanhere | G06F 21/54 |
| 2016/0283714 A1 | 9/2016 | LeMay et al. | |
| 2016/0300060 A1* | 10/2016 | Pike | G06F 17/30371 |
| 2016/0381043 A1* | 12/2016 | Yamada | H04L 63/1425 |
| | | | 726/23 |
| 2017/0090926 A1* | 3/2017 | Spear | G06F 9/30072 |
| 2017/0116418 A1* | 4/2017 | Shanmugavelayutham | |
| | | | G06F 21/566 |
| 2017/0177463 A1* | 6/2017 | Kleen | G06F 11/366 |
| 2017/0255781 A1* | 9/2017 | Godas-Lopez | G06F 21/577 |
| 2018/0095764 A1 | 4/2018 | Sultana et al. | |
| 2018/0189063 A1* | 7/2018 | Fleming | G06F 9/3016 |
| 2018/0225446 A1* | 8/2018 | Liu | G06F 11/3466 |

OTHER PUBLICATIONS

Das, Sanjeev et al., "Reconfigurable Dynamic Trusted Platform Module for Control Flow Checking", 2014 IEEE Computer Society Annual Symposium on VLSI, pp. 166-171. (Year: 2014).*

Davi, Lucas et al., "Hardware-Assisted Fine-Grained Control-Flow Integrity: Towards Efficient Protection of Embedded Systems Against Software Exploitation", DAC '14, Jun. 1-5, 2014, 6 pages. (Year: 2014).*

Muench, Marius et al., "Taming Transactions: Towards Hardware-Assisted Control Flow Integrity Using Transactional Memory", RAID 2016, LNCS 9854, pp. 24-48. (Year: 2016).*

Niu, Ben et al., "Modular Control-Flow Integrity", PLDI'14, Jun. 9-11, 2014, pp. 577-587. (Year: 2014).*

Arora, Divya et al., "Hardware-Assisted Run-Time Monitoring for Secure Program Execution on Embedded Processors", IEEE Transactions on Very Large Scale Integration (VLSI) Systems, vol. 14, No. 12, Dec. 2006, pp. 1295-1308. (Year: 2006).*

International Search Report and Written Opinion issued in PCT Application No. PCT/US2017/049499, dated Dec. 11, 2017, 11 pages.

Abadi, M., et al.:"Control-Flow Integrity Principles, Implementations and Applications", ACM Transactions on Information and System Security, vol. 13, No. 1, Article 4, Oct. 2009, 40 pages.

Abad, F., et al.: "On-Chip Control Flow Integrity Check for Real Time Embedded Systems", IEEE 2013, pp. 26-31.

Kruegel, C., et al.: "Static Disassembly of Obfuscated Binaries", The USENIX Association, Aug. 9-13, 2004, 16 pages.

Office Action issued in U.S. Appl. No. 15/283,370, dated Dec. 15, 2017, 8 pages.

Chapter 36, Intel(R) Processor Trace, Intel 64 and IA-32 Architectures Software Developer's Manual, Jun. 2016, vol. 3(3A, 3B, 3C, 3D): System Programming Guide, Intel, Santa Clara, CA, USA, 80 pages.

U.S. Appl. No. 15/283,370, filed Oct. 1, 2016.

Office Action issued in U.S. Appl. No. 15/283,370, dated Jun. 14, 2018, 15 pages.

* cited by examiner

CONTROL FLOW INTEGRITY

FIELD

The present disclosure relates to control flow, in particular to, control flow integrity.

BACKGROUND

Return oriented programming (ROP) and jump oriented programming (JOP) are each a form of control flow hijacking attack. These attacks leverage memory corruption bugs, e.g., buffer overflow, to redirect control flow to already existing executable code stored in memory. The attacks rely on short instruction sequences, called "gadgets", that end with an indirect branch instruction (e.g., return, jump*, call*, where *corresponds to indirect addressing) and perform attacker-chosen operations. Control flow integrity (CFI) validation techniques may provide a defense against control flow hijacking attacks. CFI validation techniques are configured to guarantee legitimate control flow transfers in an application. Existing CFI validation techniques may require source code modification and/or binary re-instrumentation to insert runtime CFI checks in an application binary. Further, existing CFI validation techniques may incur a performance penalty and/or may provide only a limited history, thus, limiting accuracy.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
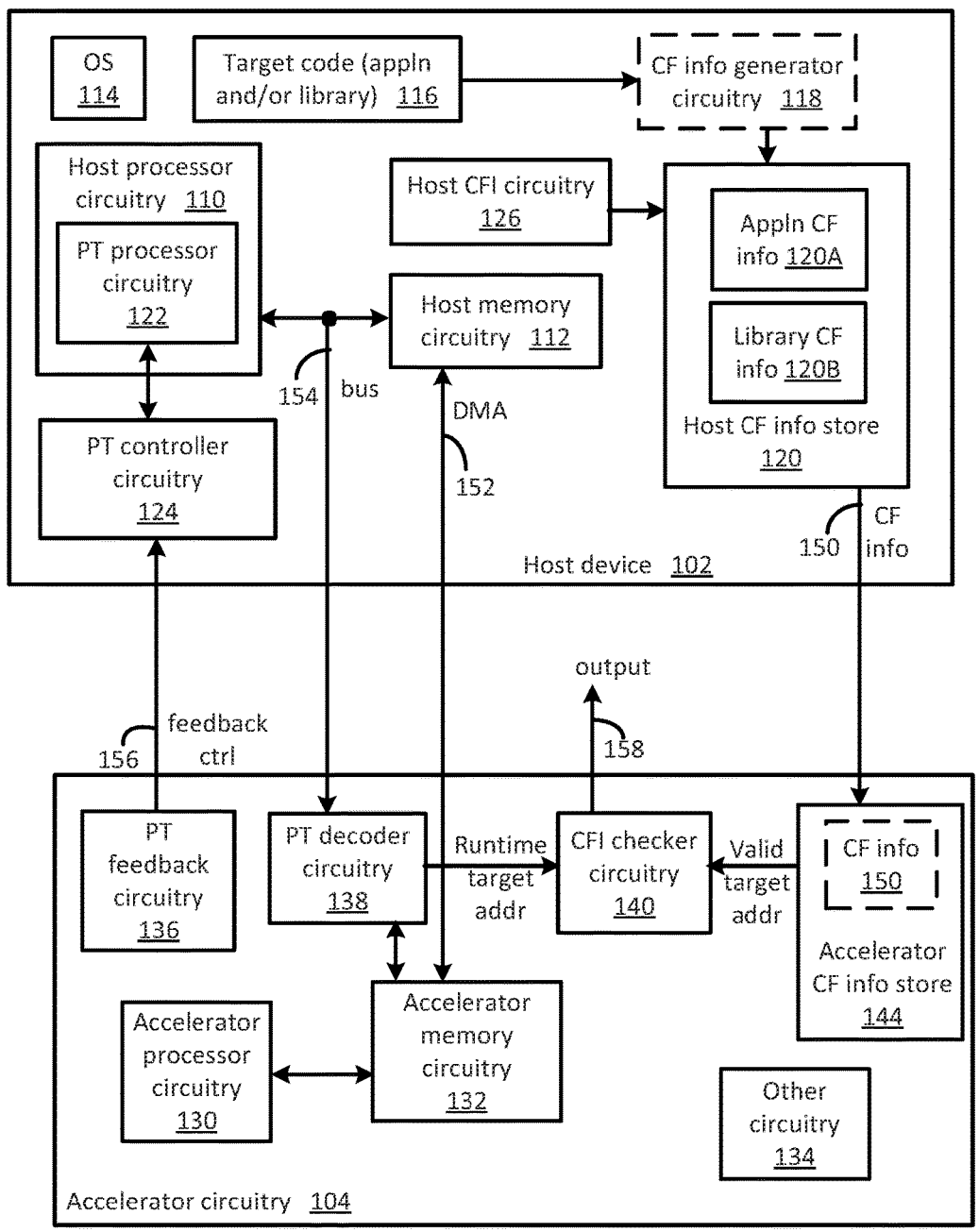
FIG. 1 illustrates a functional block diagram of a control flow integrity system that includes a host device and accelerator circuitry consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

An instruction trace tool, e.g., Intel® Processor Trace (PT) available from Intel® Corp., may be configured to capture information (i.e., PT data) related to execution of a target application, a plurality of applications, selected memory ranges and/or an entire system. The PT data is collected in data packets by PT processor circuitry. The PT data may include, e.g., timing information, program flow information (e.g., branch targets, branch taken/not taken indicators, function return addresses), etc. The data packets may be stored temporarily by the PT processor circuitry and may then be provided to memory and/or other storage for analysis. The PT data may then be utilized for control flow analysis operations, e.g., to reconstruct the program flow.

The PT data may include a plurality of data packets that may include timing information and/or program flow information. PT data may include target instruction pointer (TIP) packets, TNT (taken/not taken) packets, flow update packets (FUPs) and/or mode packets. FUPs are configured to provide source IP (instruction pointer) addresses for asynchronous events, e.g., interrupts and exceptions, as well as other situations where a source address may not be determined from the binary code. TIP packets are configured to contain a TIP corresponding to a target address of indirect branch instructions, exceptions, interrupts and/or other branches or events. For example, a TIP packet may contain a runtime target address associated with indirect branch instruction, e.g., a return address (i.e., RET) associated with a function call instruction.

A TNT packet may be configured to track "direction" (e.g., taken or not taken) of a deterministic branch instruction. A TNT packet may be utilized to provide a "compressed" return target indicator for an associated function call instruction. For example, the TNT indicator (e.g., the TNT indicator corresponding to "taken") included in the TNT packet may be utilized to indicate that a function call instruction return target corresponds to the instruction that follows the function call instruction.

A control flow graph (CFG) is a representation, using graph notation, of legitimate control flow, i.e., execution paths, that may be traversed through an application during execution of the application. In a control flow graph, each node in the graph corresponds to a basic block. A basic block is a sequence of instructions where control enters only at the beginning of the sequence and control leaves only at the end of the sequence. For example, a destination address, may correspond to a start of a basic block and an indirect branch instruction may correspond to an end of the block. A target address of the indirect branch instruction may correspond to a beginning address of a next/reachable basic block in the CFG. Edges between two basic blocks (e.g., a first block and a second block) represent control flow transfer from the end of the first block to the beginning of the second block. A node may thus include a start address of the basic block, an end address of the basic block and a beginning address of a next/reachable basic block. A control flow graph may be generated by, for example, source code analysis, binary analysis, static binary analysis, execution profiling, etc.

Control flow integrity (CFI) validation techniques are configured to enforce a CFI security policy that control flow transfers during execution of an application transfer control to valid target addresses. CFI validation techniques may thus be used to mitigate control flow hijack attacks. Generally, CFI validation is configured to compare a runtime control flow transfer and/or a runtime execution path at indirect or conditional branches, determined at runtime, to a valid control flow transfer and/or valid execution path, determined prior to runtime. As used herein, indirect branch instructions may include, but are not limited to, indirect jump instructions, indirect function calls, function returns, switch case instructions and exception handlers, etc., that involve updating the instruction pointer from a register or a memory location.

CFI validation techniques may be categorized as coarse-grained or fine-grained. Generally, coarse-grained control flow integrity techniques are configured to validate only target (i.e., destination) addresses associated with indirect branch instructions. In other words, a path from the address of the indirect branch instruction to the target destination address may not be checked. Fine-grained control flow integrity techniques are configured to validate the path between the source of an indirect branch instruction and the target address of the branch. Fine-grained control flow integrity techniques may generally detect most control flow attacks but may be relatively difficult to implement and/or may result in a performance penalty. Coarse-grained control flow integrity techniques may be relatively easier to implement with a relatively lesser performance penalty, but may not detect all control flow attacks. Both fine-grained and coarse-grained CFI techniques, implemented on host processor circuitry, may thus result in a performance penalty experienced by an application that is executing on the host processor circuitry.

Generally, this disclosure relates to control flow integrity (CFI). An apparatus, method and/or system are configured to offload PT decoding and CFI validation operations, performed at runtime, from host processor circuitry, included in a host device, to accelerator circuitry. The accelerator circuitry may be included in or coupled to the host device. Offloading the PT decoding and CFI validation operations is configured to accelerate overall performance of the CFI validation operations. Offloading the PT decoding and CFI validation operations is configured to reduce or eliminate any runtime performance penalty on the host processor circuitry that may be associated with the PT decoding and CFI validation operations. The apparatus, method and/or system are configured to implement coarse-grained CFI validation, thus reducing performance overhead compared to fine-grained CFI validation techniques.

Processor trace (PT) data, captured during runtime from PT processor circuitry included in the host device, and control flow information (CF info), generated prior to runtime, may be utilized by the accelerator circuitry to determine whether a control flow violation exists in an executing target application at runtime, i.e., during execution of the target application. Control flow information may be determined during preprocessing operations, e.g., static analysis, prior to execution of the target application. The PT data may include TIP (target instruction pointer) packets that provide target IP addresses (i.e., branch targets) for indirect branch instructions. For example, the TIP packets may include target IP addresses for indirect calls, indirect jumps, function returns and interrupts. PT decoding operations include extracting a TIP packet from the PT data and decoding the TIP packet to yield a runtime target address.

FIG. 1 illustrates a functional block diagram of a control flow integrity system 100 that includes host device 102 and accelerator circuitry 104, consistent with several embodiments of the present disclosure. Accelerator circuitry 104 may be included in and/or coupled to the host device 102. Host device 102 may include, but is not limited to, a mobile telephone including, but not limited to a smart phone (e.g., iPhone®, Android®-based phone, Blackberry®, Symbian®-based phone, Palm®-based phone, etc.); a wearable device (e.g., wearable computer, "smart" watches, smart glasses, smart clothing, etc.) and/or system; an Internet of Things (IoT) networked device including, but not limited to, a sensor system (e.g., environmental, position, motion, etc.) and/or a sensor network (wired and/or wireless); a computing system (e.g., a server, a workstation computer, a desktop computer, a laptop computer, a tablet computer (e.g., iPad®, GalaxyTab® and the like), an ultraportable computer, an ultramobile computer, a netbook computer and/or a subnotebook computer; etc. Accelerator circuitry 104 may include, but is not limited to, a graphics processing unit (GPU), a Field programmable gate array (FPGA), a complex programmable logic device (CPLD), and application specific integrated circuit (ASIC), etc.

Host device 102 includes host processor circuitry 110, host memory circuitry 112, operating system (OS) 114 and target code 116. Target code 116 may include an application and/or one or more libraries that may be utilized by the application. For example, host processor circuitry 110 may correspond to a single core or a multi-core general purpose processor, such as those provided by Intel® Corp., etc. In an embodiment, host processor circuitry 110 may include processor trace (PT) processor circuitry 122, as will be described in more detail below. Host device 102 may further include a host CF information (CF info) store 120, PT controller circuitry 124 and host CFI circuitry 126. Host CF info store 120 is configured to store application CF info 120A and library CF info 120B. Host device 102 may further include CF info generator circuitry 128, at least during static analysis operations, configured to generate application CF info 120A and/or library CF info 120B.

Accelerator circuitry 104 includes accelerator processor circuitry 130, accelerator memory circuitry 132 and may include other circuitry 134. Accelerator processor circuitry 130 may correspond to a single core or a multicore general purpose and/or special purpose processing unit, such as those provided by Intel® Corp., etc. Accelerator circuitry 104 may further include PT feedback circuitry 136, PT decoder circuitry 138, CFI checker circuitry 140 and accelerator CF info store 144. In some embodiments, the accelerator circuitry 104 may be configured to perform other operations, e.g., graphics processing. Other circuitry 134 may be configured to utilize at least some resources of accelerator circuitry 104. Thus, accelerator circuitry 104 may be shared by PT feedback circuitry 136, PT decoder circuitry 138, CFI checker circuitry 140, accelerator CF info store 144 and other circuitry 134.

CF info generator circuitry 118 is configured to generate control flow information statically, in advance of execution of a corresponding application, using one or more static analysis techniques. Control flow information is configured to include valid target addresses of indirect branch instructions as well as a corresponding type of indirect branch target. Valid targets of indirect branch instructions may include, but are not limited to, a return address and addresses associated with functions, switch case statements and/or exception handlers. A return address is an address of an instruction that is preceded by a call instruction. An address associated with function is a beginning address (i.e., start address) of a function. An address associated with a switch case statement is an address of a case block for the switch case statement. An address associated with an exception handler is a start address of a catch of a try/catch block of the exception handler and/or an address of a runtime function. Thus, the branch targets may include, but are not limited to, a beginning address of a function ("function beginning"), an address of a case block for a switch/case statement ("switch/case statement target address"), a start address of a catch of a try/catch block of an exception handler ("exception handler target address") and/or a return address. CF info may thus include one or more valid target addresses, i.e., valid destinations for indirect branch instructions, and their associated types.

CF info generator circuitry 118 is configured to generate CF info for the target application binary code (i.e., executable code) and any library binary code used by the target application binary code. The CF info may be generated via static analysis of the application binary code and library binary code. The CF info may generally be generated in an off-line process. The indirect branch destination addresses extracted from the static analysis of the binaries are with respect to the static beginning address of the binary code. At runtime, the application binary code and library binaries may be loaded to addresses that differ from the static beginning addresses used during the static analysis. Thus, runtime module (map) load information may be used to translate the runtime indirect branch target to the statically determined and stored indirect branch destination address as Computed Target=runtime address−runtime module load address+static module beginning address. Thus, CF info generator circuitry 118 may be configured to generate the CF info based, at least in part, on target application binary code and/or library binary code 116. The CF info, i.e., application CF info 120A and/or library CF info 120B, may be stored to host CF info store 120.

During operation, OS 114 may be configured to launch target code 116. Prior to launch of target code 116, i.e., prior to execution of a corresponding application and associated libraries, at least some CF info 150 may be provided to accelerator circuitry 104 and stored to accelerator CF info store 144 by, e.g., host CFI circuitry 126. The CF info 150 may include a relatively large amount of data and may thus consume a relatively large amount of memory. An amount of CF info transferred prior to launch of execution of target code 116 may be related to a capacity of, e.g., accelerator memory circuitry 132, and thus, accelerator CF info store 144.

For example, if the available capacity of accelerator memory circuitry 132 and/or accelerator CF info store 144 is greater than the amount of CF info, then all of the CF info may be transferred prior to launch a target code 116. In another example, if the available capacity of accelerator memory circuitry 132 and/or accelerator CF info store 144 is limited, e.g., is less than the amount of CF info, then only a portion of CF info may be transferred from host CF info store 120 to accelerator CF info store 144, prior to launch of target code 116. Additional portions of CF info may then be transferred during operation, i.e., during execution of target code and CFI validation operations. Transferring a portion of CF info during operation may consume relatively less memory capacity in accelerator circuitry 104 but may result in a performance penalty associated with the CFI validation operations. Transferring all of CF info 150 to accelerator CF info store 144 prior to CFI validation operations may consume more accelerator circuitry 104 memory capacity but may result in a corresponding improvement in performance. Thus, consumption of memory capacity may be traded off with performance.

Thus, CF info generator circuitry 118 is configured to generate CF info 120A, 120B, prior to execution of target code 116, and to store the CF info 120A, 120B to host CF info store 120. A portion or all of the CF info may then be provided to accelerator CF info store 144, at or near launch (i.e., start of execution) of the target code 116.

During execution of target code 116, i.e., at runtime, PT processor circuitry 122 is configured to capture and/or generate PT data. The PT controller circuitry 124 is configured to capture PT data from PT processor circuitry 122. The PT data may generally include target instruction pointer (TIP) packets, TNT (taken/not taken) packets, flow update packets (FUPs) and/or mode packets, as described herein. Thus, PT data may include a number of data packets. It may be appreciated that Processor Trace may generate a relatively large amount of PT data in a relatively short time.

In an embodiment, PT controller circuitry 124 may configure PT processor circuitry 122 to capture only TIP packets. The TIP packets may correspond to target addresses associated with indirect calls and/or jumps, function returns and/or interrupts. In other words, PT processor circuitry 122 may be capable of capturing a variety of PT data and corresponding PT packets, as described herein. Such operations of PT processor circuitry 122 may contribute to overhead associated with, e.g., host processor circuitry 110. Configuring PT processor circuitry 122 to selectively capture TIP packets may reduce the overhead and a corresponding performance penalty. Reduced overhead may enhance control flow integrity validation operations.

The captured PT data may include a target instruction pointer (TIP) packet that includes a runtime target address of an indirect branch instruction of an executing target application. The TIP packet is configured to provide a target IP address (i.e., branch target) for an indirect branch instruction. The PT data and corresponding TIP packet may not include type information related to the branch target. Thus, it may not be evident from a TIP packet, the type of branch instruction.

The captured PT data may be stored to host memory circuitry 112 and/or provided to accelerator circuitry 104, e.g., to PT decoder circuitry 138 and/or accelerator memory circuitry 132. The PT data may be provided from the host device 102 to the accelerator circuitry 104 via one or more techniques. In one example, the PT data may be provided via direct memory access (DMA) 152. In this example, the PT data may be stored to host memory circuitry 112, may be retrieved from the host memory circuitry 112 via DMA 152 and stored to accelerator memory circuitry 132. In another example, the PT data may be captured from PT processor circuitry 122 and/or PT controller circuitry 124 and transmitted to the accelerator memory circuitry 132 via a package bus, e.g., a dedicated point-to-point interface, i.e., an in-die interconnect 154.

Thus, prior to execution of target code 116, CF info generator circuitry 118 may generate CF info for target code 116 including both application target code and associated library target code. The CF info may be stored in host CF info store 120. At or near the launch of target code 116, the CF info 150 may be provided to accelerator circuitry 104, e.g., accelerator CF info store 144. During execution of the target code 116, PT controller circuitry 124 is configured to capture PT data from PT processor circuitry 122. The PT data that may include TIP packets, as described herein. The accelerator circuitry 104 may then be configured to perform CFI validation operations based, at least in part, on PT data and based, at least in part, on stored CF info.

PT decoder circuitry 138 is configured to at least one of receive and/or retrieve PT data from host device 102, e.g., from PT controller circuitry 124 and/or host memory circuitry 112. The PT controller circuitry 124 may be further configured to store the received and/or retrieved PT data to accelerator memory circuitry 132. PT decoder circuitry 138 may then be configured to extract a TIP packet from the PT data and to decode the TIP packet to yield a corresponding runtime target address. The runtime target address may then be provided to CFI checker circuitry 140. CFI checker circuitry 140 may then be configured to translate the runtime target address to a corresponding static target address. The corresponding static target address may then be utilized to determine whether a control flow transfer to the runtime target address corresponds to a control flow violation based, at least in part, on CF info 150 included in and/or provided to accelerator CF info store 144.

As used herein, a runtime target address is a target address determined during runtime based, at least in part, on PT data. A corresponding static target address may be determined based, at least in part, on the runtime target address. A valid target address (i.e., valid destination address) is a target (i.e., destination) address included in statically determined CF info. Each valid target address may have been determined, using static analysis techniques, by CFI generator circuitry 118 during preprocessing operations. During control flow integrity validation operations, performed during execution of the target application on the host device, i.e. at runtime, CFI checker circuitry is configured to determine whether the static target address corresponds to (i.e., matches) a valid target address included in CF info.

CF info 150 includes valid target addresses, i.e., valid indirect branch targets, for executing target code 116, determined prior to runtime, as described herein. The static target address, translated from the runtime target address extracted from the PT data, corresponds to a runtime indirect branch target. Indirect branch instructions include indirect calls, indirect jumps and returns. Valid indirect branch targets may include a beginning address of a function ("function beginning"), an address of a case block for a switch/case statement ("switch/case statement target address"), a start address of a catch of a try/catch block of an exception handler ("exception handler target address") and/or a return address. Thus, types of branch targets include a beginning of a function, an exception handler, a switch case statement and a return address. CFI checker circuitry 140 is configured to search CF info 150, included in and/or provided to accelerator CF info store 144, to determine whether the static target address matches a valid target address.

In an embodiment, CFI checker circuitry 140 is configured to sequentially search each type of branch target. CF info 150 stored to accelerator CF info store 144 may generally include a respective group of valid branch target addresses corresponding to each type of branch target. Thus, each valid target address included in CF info 150 may be associated with a corresponding type of indirect branch target, i.e., return address, start address of a function, address of a case block, start address of a catch block, start address of an exception handler and/or start address of a runtime function. CFI checker circuitry 140 may then be configured to sequentially search by group. PT data does not generally provide information related to the type of indirect branch instruction associated with an indirect branch target address. Thus, CFI checker circuitry 140 is configured to search CF info store 144 utilizing the static target address that corresponds to the runtime target address extracted from PT data, as described herein. CFI checker circuitry 140 is configured to determine whether the static target address corresponds to a valid target address included in CF info 150 stored to accelerator CF info store 144. CFI checker circuitry 140 is configured to sequentially search each type of indirect branch target until either a valid target address is found that matches the static target address or all of the valid target addresses are searched and no match is found. In other words, CFI checker circuitry 140 is configured to determine whether static target address exists as a valid target address in CF info 150.

CFI checker circuitry 140 may be configured to search each type of indirect branch target according to a predefined order. In an embodiment, the predefined order may be set by a policy. The predefined order may be related to a defined ordering of indirect branch instructions. For example, the indirect branch instructions may be ordered as indirect call followed by indirect jump followed by return. Of course, in other examples, different orders of indirect branch instructions may be used.

Continuing with this example, valid destination addresses of an indirect branch instruction are related to the indirect branch instruction itself. Valid destination addresses of an indirect call instruction include a function beginning and an exception handler target address. Valid destination addresses of an indirect jump instruction include a function beginning and a switch/case statement target address (i.e., an address of a case block). It may be appreciated that switch/case statement target addresses are valid target addresses of indirect jump instructions since switch/case statements may be implemented as indirect jumps. A valid destination address of a return instruction is a return address. A return address corresponds to a next instruction of a call function instruction.

Thus, in this example, CFI checker circuitry 140 is configured to first determine whether the static target address (determined from the runtime target address) is included in the group of function beginning addresses and, if not, whether the static target address is included in the group of exception handler target addresses. CFI checker circuitry 140 may then be configured to determine whether the static target address is included in the group of switch/case statement target addresses. If the static target address is not included in the group of switch/case statement target addresses, then CFI checker circuitry 140 may then be configured to determine whether the static target address is included in the group of return addresses included in CF info 150. If no matching valid target address is found in the CF info, then the runtime target address may represent malicious code. In other words, if no matching valid target address is found, then the corresponding control flow transfer may correspond to a control flow violation. CFI checker circuitry 140 may then be configured to notify, e.g., host CFI circuitry 126, of the possible control flow violation. If a matching valid target address is found, then the corresponding control flow transfer to the runtime target address may not correspond to a control flow violation.

CF info 150 is configured to include most or all possible indirect branch targets, as described herein. An executing application may utilize one or more libraries, thus, CF info 150 may include a relatively large number of indirect branch targets. The relatively large volume of CF info 150 may also impact search operations associated with validating control flow integrity. Thus, the CF info 150 may be stored to and/or configured as a data structure to facilitate efficient searching. CFI checker circuitry 140 may be configured to implement a corresponding search technique. For example, the data structure and/or search technique may include, but is not limited to a hash table, a hash map, a Bloom filter, etc. A hash table is a data structure used implement an associative array. A hash table may utilize a hash function to compute an index into the array of buckets or slots, from which a desired value can be found. A Bloom filter is a space efficient probabilistic data structure that is used to test whether an element is a member of a set. CFI checker circuitry 140 may thus be configured to implement a relatively efficient lookup technique.

Thus, operations associated with CFI validation of an executing application may be performed by elements of accelerator circuitry 104. Host processor circuitry 110 may then be freed from performing CFI validation operations. Thus, a relatively greater portion of host processor circuitry 110 resources may then be available for, e.g., executing target code 116, rather than being consumed by CFI validation operations. Accelerator circuitry 104 may similarly not be responsible for generating CF info but may use the CF info generated by host device 102, a priori. Thus, CFI validation operations, as described herein, may be performed on an executing application at runtime.

In some embodiments, the accelerator circuitry 104, e.g., PT feedback circuitry 136, may be configured to provide feedback 156 to the host device 102, e.g., PT controller circuitry 124. The feedback 156 may include one or more requests from accelerator circuitry 104 (e.g., PT feedback circuitry 136) to host device 102 (e.g., PT controller circuitry 124) configured to modify operation of PT processor circuitry 122 and/or modify provision of PT data from host device 102 to accelerator circuitry 104.

In an embodiment, the feedback 156 may include a request to PT controller circuitry 124 that PT controller circuitry 124 reduce the PT data rate. For example, PT feedback circuitry 136 may be configured to request that PT controller circuitry 124 reduce the PT data rate, if CFI validation operations lag behind generation of PT data. The request may be configured to cause host processor circuitry 110 and/or PT processor circuitry 122 to reduce an amount of PT data produced in a time interval.

It may be appreciated that Processor Trace may generate a relatively large amount of PT data in a relatively short time, e.g., 700 MB (megabytes) per second. CFI validation operations may lag behind generation of PT data if a rate of PT decoding operations and/or a rate associated with CFI validation operations is too slow relative to a rate of generation of PT data. PT decoding operations include extracting a TIP packet from the PT data and decoding the TIP packet to yield a runtime target address. CFI validation operations include determining whether a control flow transfer of an indirect branch instruction to the runtime target address corresponds to a control flow violation based, at least in part, on CF info stored to accelerator CF info store 144.

In one example, an execution rate of the executing application on host processor circuitry 110 may be reduced resulting in a corresponding reduction in the amount of PT data produced in a time interval. In another example, PT processor circuitry 122 may be configured to buffer, i.e., temporarily store, at least some of the PT data to then slow, i.e., reduce, the rate of provision of PT data (i.e., PT data rate) to accelerator circuitry 104. In this example, it is assumed that the PT processor circuitry 122 contains at least some dedicated memory. The amount of buffering may be constrained by the PT processor circuitry dedicated memory capacity.

In another embodiment, the feedback 156 may include a request to dynamically reconfigure PT processor circuitry 122. For example, PT feedback circuitry 136 may be configured to request dynamic reconfiguration of PT processor circuitry 122. Such requests may be provided from PT feedback circuitry 136 to PT controller circuitry 124. PT controller circuitry 124 may then reconfigure PT processor circuitry 122. The dynamic reconfiguration may be configured to reconfigure the PT processor circuitry 122 to activate or deactivate one or more PT filtering capabilities. The PT filtering capabilities may include, but are not limited to, reporting source and destination addresses of TIP packets, activating or deactivating RET compression and/or including additional information in PT packets, e.g., program state (general purpose registers (GPRs)).

At least some of operations of accelerator circuitry 104 may be performed at least partially in parallel, i.e., may be pipelined. For example, CFI validation analysis (i.e., CFI checking) operations of CFI checker circuitry 140 may at least partially overlap (in time) PT decoding by PT decoder circuitry 138. PT decoding operations include extracting a TIP packet from the PT data and decoding the TIP packet to yield a runtime target address. In another example, feedback related operations (i.e., requests from accelerator circuitry 104 to host device 102) of PT feedback circuitry 136 may overlap, in time, CFI checking and/or PT decoding operations. Such parallel operation and associated performance enhancement is configured to facilitate validating CFI in real time, i.e., during runtime.

Thus, operations associated with CFI validation of an executing application may be performed by elements of accelerator circuitry 104. Offloading the control flow integrity validation operations to the accelerator circuitry is configured to enhance performance of, e.g., host processor circuitry. Thus, control flow integrity validation operations may be performed, at runtime, utilizing captured PT data and stored control flow information that has been determined, in advance, utilizing static analysis techniques.

Figure 2:
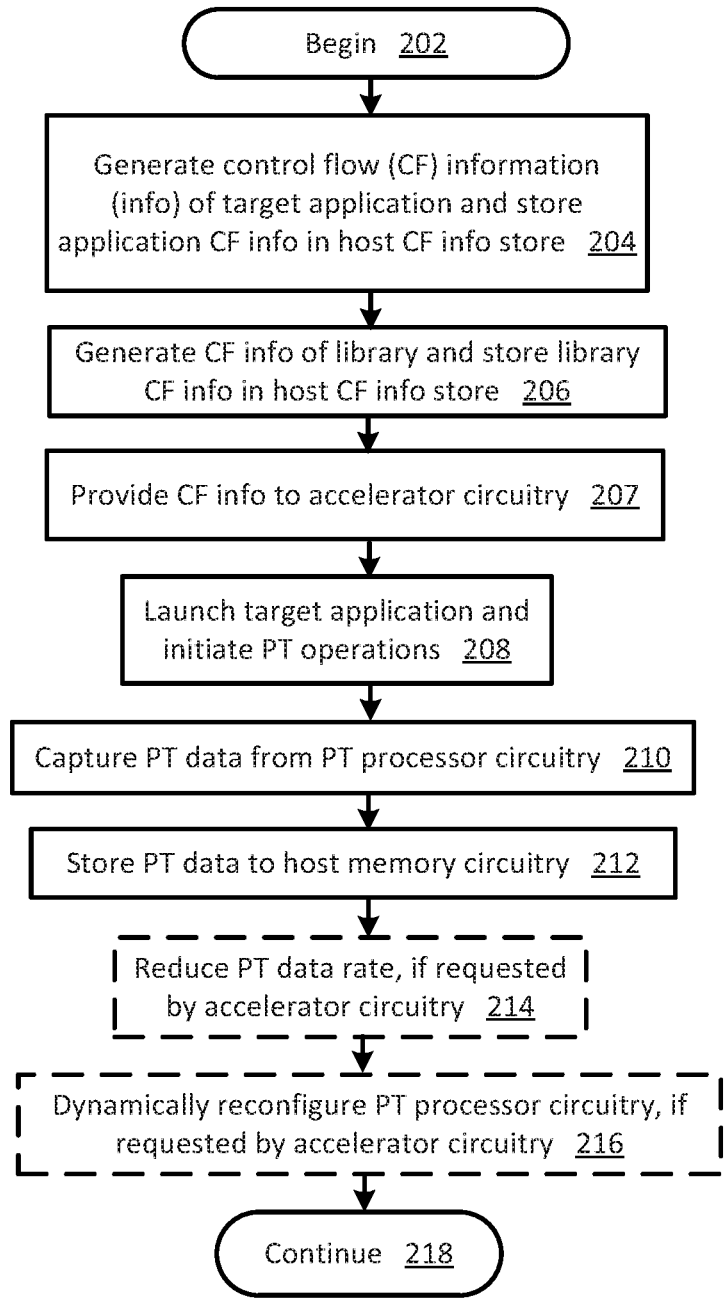
FIG. 2 is a flowchart of host device operations according to various embodiments of the present disclosure.

FIG. 2 is a flowchart 200 of host device operations according to various embodiments of the present disclosure. In particular, the flowchart 200 illustrates preprocessing operations configured to generate CF info, provide the CF info to accelerator circuitry and to capture PT data during execution of a corresponding application. The operations may be performed, for example, by CF info generator circuitry 118, host CFI circuitry 126, OS 114, PT processor circuitry 122 and/or PT controller circuitry 124 of FIG. 1.

Operations of this embodiment may begin with begin at operation 202. Control flow information of a target application may be generated and application CF info may be stored in host CF info store at operation 204. Control flow information of a library may be generated and library CF info may be stored in host CF info store at operation 206. CF info may be provided to accelerator circuitry at operation 207. The target application may be launched and PT operations may be initiated at operation 208. PT data may be captured from PT processor circuitry at operation 210. PT data may be stored to host memory circuitry at operation 212.

In some embodiments, if requested by accelerator circuitry, a PT data rate may be reduced at operation 214. In some embodiments, if requested by accelerator circuitry, PT processor circuitry may be dynamically reconfigured at operation 216. Program flow may then continue at operation 218.

Thus, preprocessing and PT data capture operations may be performed by a host device.

Figure 3:
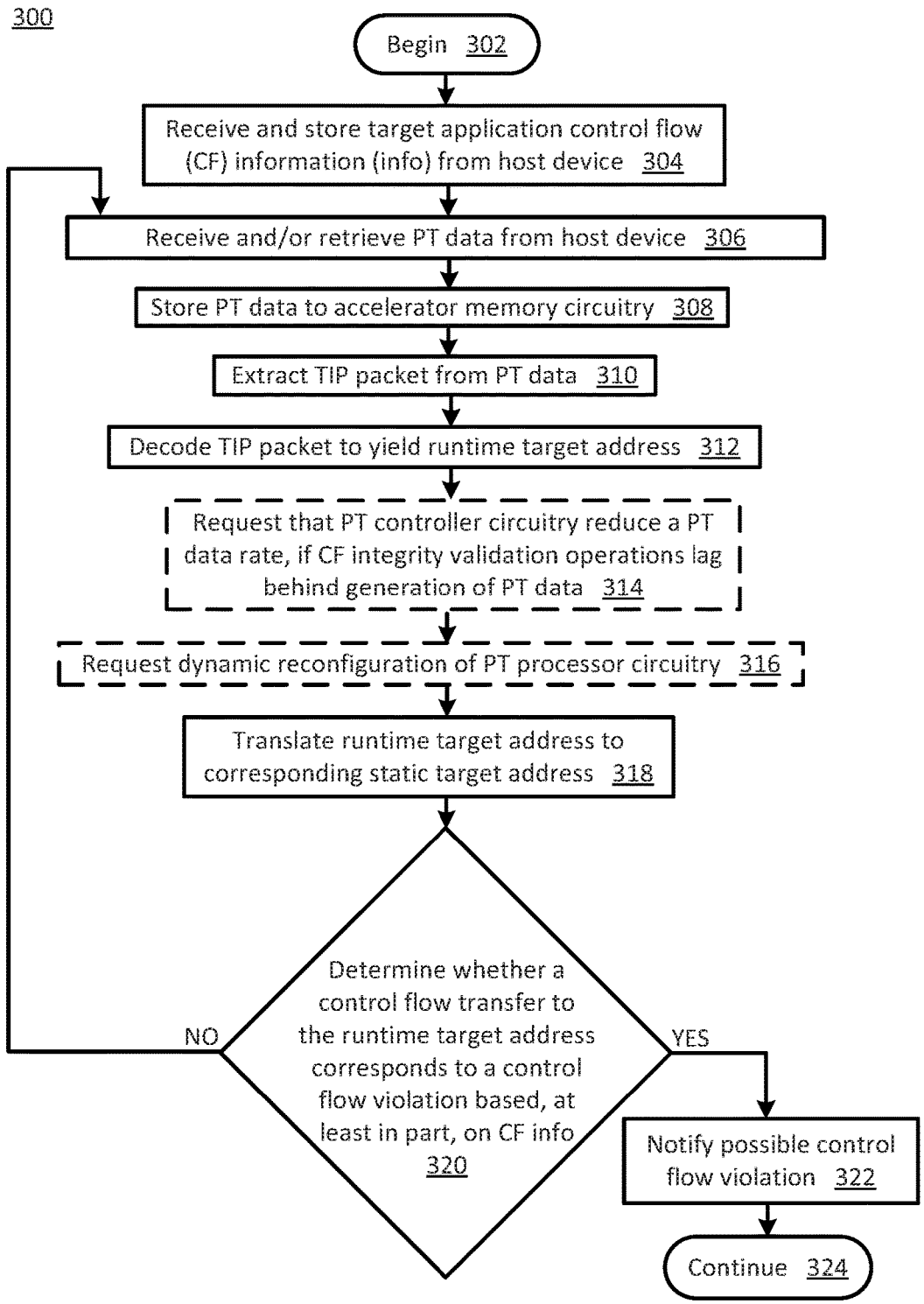
FIG. 3 is a flowchart of accelerator circuitry operations according to various embodiments of the present disclosure.

FIG. 3 is a flowchart 300 of accelerator circuitry operations according to various embodiments of the present disclosure. In particular, the flowchart 300 illustrates operations configured to determine whether a control flow transfer to a runtime target address corresponds to a control flow violation based, at least in part, on CF info. The operations may be performed, for example, by PT feedback circuitry 136, PT decoder circuitry 138 and/or CFI checker circuitry 140, of FIG. 1.

Operations of this embodiment may begin with begin at operation 302. Target application control flow information may be received from a host device and stored at operation 304. PT data may be received and/or retrieved from the host device at operation 306. The PT data may be stored to accelerator memory circuitry at operation 308. A TIP packet may be extracted from PT data at operation 310. The TIP packet may be decoded to yield a runtime target address at operation 312.

In some embodiments, PT controller circuitry may be requested to reduce the PT data rate, if CF integrity validation operations lag behind generation of PT data, at operation 314. In some embodiments, dynamic reconfiguration of PT processor circuitry may be requested at operation 316.

The runtime target address may be translated to a corresponding static target address at operation 318. Whether a control flow transfer to the runtime target address corresponds to a control flow violation may be determined based, at least in part, on CF info at operation 320. If the control flow transfer to the runtime target address does not correspond to a control flow violation, then program flow may return to operation 306. If the control flow transfer to the runtime target address corresponds to a control flow violation, then a possible control flow violation may be notified at operation 322. Program flow may then continue at operation 324.

While the flowcharts of FIGS. 2 and 3 illustrate operations according various embodiments, it is to be understood that not all of the operations depicted in FIGS. 2 and 3 are necessary for other embodiments. In addition, it is fully contemplated herein that in other embodiments of the present disclosure, the operations depicted in FIGS. 2 and/or 3 and/or other operations described herein may be combined in a manner not specifically shown in any of the drawings, and such embodiments may include less or more operations than are illustrated in FIGS. 2 and 3. Thus, claims directed to features and/or operations that are not exactly shown in one drawing are deemed within the scope and content of the present disclosure.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor 110 executing code and/or instructions sets (e.g., software, firmware, etc.) corresponding to the functionality described herein, thus transforming a general-purpose processor into a specific-purpose processing environment to perform one or more of the operations described herein.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface.

The operating system (OS) 114 may be configured to manage system resources and control tasks that are run on, e.g., host device 102. For example, the OS may be implemented using Microsoft® Windows®, HP-UX®, Linux®, or UNIX®, although other operating systems may be used. In another example, the OS may be implemented using Android™, iOS, Windows Phone® or BlackBerry®. In some embodiments, the OS may be replaced by a virtual machine monitor (or hypervisor) which may provide a layer of abstraction for underlying hardware to various operating systems (virtual machines) running on one or more processing units.

Host memory circuitry 112 and/or accelerator memory circuitry 132 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog—Unified Hardware Design, Specification, and Verification Language, dated Jul. 7, 2011; IEEE Std 1800™-2012: IEEE Standard for SystemVerilog-Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards.

EXAMPLES

Examples of the present disclosure include subject material such as a method, means for performing acts of the method, a device, or of an apparatus or system related to control flow integrity, as discussed below.

Example 1

According to this example, there is provided an accelerator circuitry. The accelerator circuitry includes accelerator processor circuitry; accelerator memory circuitry; processor trace (PT) decoder circuitry and control flow integrity (CFI) checker circuitry. The PT decoder circuitry is to at least one of receive and/or retrieve PT data from a host device. The PT decoder circuitry is further to extract a target instruction pointer (TIP) packet from the PT data and to decode the TIP packet to yield a runtime target address. The CFI checker circuitry is to determine, at runtime, whether a control flow transfer of an indirect branch instruction to the runtime target address corresponds to a control flow violation based, at least in part, on control flow (CF) information (info) stored to an accelerator CF info store.

Example 2

This example includes the elements of example 1, further including PT feedback circuitry to request that PT controller circuitry, included in the host device, reduce a PT data rate, if CFI validation operations lag behind generation of the PT data.

Example 3

This example includes the elements of example 1, wherein the CFI checker circuitry is to translate the runtime target address to a corresponding static target address and to determine whether the static target address matches a valid target address included in the CF info.

Example 4

This example includes the elements according to any one of examples 1 to 3, wherein the PT data is received via a direct memory access to host memory circuitry.

Example 5

This example includes the elements according to any one of examples 1 to 3, wherein the PT data is received via a dedicated point-to-point interface bus.

Example 6

This example includes the elements according to any one of examples 1 to 3, wherein the indirect branch instruction is selected from the group including an indirect call, an indirect jump and a return, and the CF info includes a plurality of valid target addresses, each valid target address selected from the group including a beginning address of a function, an address of a case block for a switch case statement, a start address of a catch of a try/catch block of an exception handler, an address of a runtime function and a return address.

Example 7

This example includes the elements according to any one of examples 1 to 3, wherein the determining whether the control flow transfer to the runtime target address corresponds to the control flow violation is coarse-grained.

Example 8

This example includes the elements of example 2, wherein the PT feedback circuitry is further to request dynamic reconfiguration of PT processor circuitry included in the host device.

Example 9

This example includes the elements according to any one of examples 1 to 3, wherein the CF info is organized in a data structure in the accelerator CF info store, the data structure configured to facilitate search.

Example 10

This example includes the elements of example 2, wherein at least a portion of operations of the PT decoder circuitry, the CFI checker circuitry and the PT feedback circuitry are performed in parallel.

Example 11

According to this example, there is provided a control flow integrity system. The control flow integrity system includes a host device and accelerator circuitry. The host device includes host processor circuitry to execute a target application, host memory circuitry, processor trace (PT) processor circuitry to capture PT data related to an executing application, and PT controller circuitry to configure the PT processor circuitry. The accelerator circuitry includes accelerator processor circuitry; accelerator memory circuitry; processor trace (PT) decoder circuitry and control flow integrity (CFI) checker circuitry. The PT decoder circuitry is to at least one of receive and/or retrieve the PT data from the host device. The PT decoder circuitry is further to extract a target instruction pointer (TIP) packet from the PT data and to decode the TIP packet to yield a runtime target address. The CFI checker circuitry is to determine, at runtime, whether a control flow transfer of an indirect branch instruction to the runtime target address corresponds to a control flow violation based, at least in part, on control flow (CF) information (info) stored to an accelerator CF info store.

Example 12

This example includes the elements of example 11, wherein the accelerator circuitry further includes PT feedback circuitry to request that the PT controller circuitry reduce a PT data rate, if CFI validation operations lag behind generation of the PT data.

Example 13

This example includes the elements of example 11, wherein the CFI checker circuitry is to translate the runtime target address to a corresponding static target address and to determine whether the static target address matches a valid target address included in the CF info.

Example 14

This example includes the elements according to any one of examples 11 to 13, wherein the PT data is received via a direct memory access to the host memory circuitry.

Example 15

This example includes the elements according to any one of examples 11 to 13, wherein the PT data is received via a dedicated point-to-point interface bus.

Example 16

This example includes the elements according to any one of examples 11 to 13, wherein the indirect branch instruction is selected from the group including an indirect call, an indirect jump and a return, and the CF info includes a plurality of valid target addresses, each valid target address selected from the group including a beginning address of a function, an address of a case block for a switch case statement, a start address of a catch of a try/catch block of an exception handler, an address of a runtime function and a return address.

Example 17

This example includes the elements according to any one of examples 11 to 13, wherein the determining whether the control flow transfer to the runtime target address corresponds to the control flow violation is coarse-grained.

Example 18

This example includes the elements of example 12, wherein the PT feedback circuitry is further to request dynamic reconfiguration of the PT processor circuitry.

Example 19

This example includes the elements according to any one of examples 11 to 13, wherein the CF info is organized in a data structure in the accelerator CF info store, the data structure configured to facilitate search.

Example 20

This example includes the elements of example 12, wherein at least a portion of operations of the PT decoder circuitry, the CFI checker circuitry and the PT feedback circuitry are performed in parallel.

Example 21

This example includes the elements according to any one of examples 11 to 13, wherein the accelerator circuitry is selected from the group including a graphics processing unit (GPU), a Field programmable gate array (FPGA), a complex programmable logic device (CPLD) and an application-specific integrated circuit (ASIC).

Example 22

This example includes the elements according to any one of examples 11 to 13, wherein the host device further includes CF info generator circuitry to generate the CF info based, at least in part, on the target application.

Example 23

This example includes the elements of example 12, wherein reducing the PT data rate includes reducing an execution rate of the executing application.

Example 24

This example includes the elements according to any one of examples 11 to 13, wherein the host device further includes host CFI circuitry to provide the CF info from a host CF info store to the accelerator CF info store.

Example 25

According to this example, there is provided a control flow integrity method. The method includes at least one of receiving and/or retrieving, by processor trace (PT) decoder circuitry, PT data from a host device; extracting, by the PT decoder circuitry, a target instruction pointer (TIP) packet from the PT data; decoding, by the PT decoder circuitry, the TIP packet to yield a runtime target address; and determining, by control flow integrity (CFI) checker circuitry, at runtime, whether a control flow transfer of an indirect branch instruction to the runtime target address corresponds to a control flow violation based, at least in part, on control flow (CF) information (info) stored to an accelerator CF info store included in accelerator circuitry.

Example 26

This example includes the elements of example 25, further including requesting, by PT feedback circuitry, that PT controller circuitry, included in the host device, reduce a PT data rate, if CFI validation operations lag behind generation of the PT data.

Example 27

This example includes the elements of example 25, further including translating, by the CFI checker circuitry, the runtime target address to a corresponding static target address; and determining, by the CFI checker circuitry, whether the static target address matches a valid target address included in the CF info.

Example 28

This example includes the elements of example 25, wherein the PT data is received via a direct memory access to host memory circuitry.

Example 29

This example includes the elements of example 25, wherein the PT data is received via a dedicated point-to-point interface bus.

Example 30

This example includes the elements of example 25, wherein the indirect branch instruction is selected from the group including an indirect call, an indirect jump and a return, and the CF info includes a plurality of valid target addresses, each valid target address selected from the group including a beginning address of a function, an address of a case block for a switch case statement, a start address of a catch of a try/catch block of an exception handler, an address of a runtime function and a return address.

Example 31

This example includes the elements of example 25, wherein the determining whether the control flow transfer to the runtime target address corresponds to the control flow violation is coarse-grained.

Example 32

This example includes the elements of example 26, further including requesting, by the PT feedback circuitry, dynamic reconfiguration of the PT processor circuitry included in the host device.

Example 33

This example includes the elements of example 25, wherein the CF info is organized in a data structure in the accelerator CF info store, the data structure configured to facilitate search.

Example 34

This example includes the elements of example 26, wherein at least a portion of operations of the PT decoder circuitry, the CFI checker circuitry and the PT feedback circuitry are performed in parallel.

Example 35

This example includes the elements of example 25, wherein the accelerator circuitry is selected from the group including a graphics processing unit (GPU), a Field programmable gate array (FPGA), a complex programmable logic device (CPLD) and an application-specific integrated circuit (ASIC).

Example 36

This example includes the elements of example 25, further including generating, by CF info generator circuitry, the CF info based, at least in part, on an application.

Example 37

This example includes the elements of example 26, wherein reducing the PT data rate includes reducing an execution rate of an application.

Example 38

This example includes the elements of example 25, further including providing, by host CFI circuitry, the CF info from a host CF info store to the accelerator CF info store.

Example 39

According to this example, there is provided a computer readable storage device. The device has stored thereon instructions that when executed by one or more processors result in the following operations including at least one of receiving and/or retrieving processor trace (PT) data from a host device; extracting a target instruction pointer (TIP) packet from the PT data; decoding the TIP packet to yield a runtime target address; and determining, at runtime, whether a control flow transfer of an indirect branch instruction to the runtime target address corresponds to a control flow violation based, at least in part, on control flow (CF) information (info) stored to an accelerator CF info store included in accelerator circuitry.

Example 40

This example includes the elements of example 39, wherein the instructions that when executed by one or more processors results in the following additional operations including requesting that PT controller circuitry, included in the host device, reduce a PT data rate, if CFI validation operations lag behind generation of the PT data.

Example 41

This example includes the elements of example 39, wherein the instructions that when executed by one or more processors results in the following additional operations including translating the runtime target address to a corresponding static target address; and determining whether the static target address matches a valid target address included in the CF info.

Example 42

This example includes the elements according to any one of examples 39 to 41, wherein the PT data is received via a direct memory access to host memory circuitry.

Example 43

This example includes the elements according to any one of examples 39 to 41, wherein the PT data is received via a dedicated point-to-point interface bus.

Example 44

This example includes the elements according to any one of examples 39 to 41, wherein the indirect branch instruction is selected from the group including an indirect call, an indirect jump and a return, and the CF info includes a plurality of valid target addresses, each valid target address selected from the group including a beginning address of a function, an address of a case block for a switch case statement, a start address of a catch of a try/catch block of an exception handler, an address of a runtime function and a return address.

Example 45

This example includes the elements according to any one of examples 39 to 41, wherein the determining whether the control flow transfer to the runtime target address corresponds to the control flow violation is coarse-grained.

Example 46

This example includes the elements of example 40, wherein the instructions that when executed by one or more processors results in the following additional operations including requesting dynamic reconfiguration of PT processor circuitry included in the host device.

Example 47

This example includes the elements according to any one of examples 39 to 41, wherein the CF info is organized in a data structure in the accelerator CF info store, the data structure configured to facilitate search.

Example 48

This example includes the elements of example 40, wherein at least a portion of the operations are performed in parallel.

Example 49

This example includes the elements according to any one of examples 39 to 41, wherein the accelerator circuitry is selected from the group including a graphics processing unit (GPU), a Field programmable gate array (FPGA), a complex programmable logic device (CPLD) and an application-specific integrated circuit (ASIC).

Example 50

This example includes the elements according to any one of examples 39 to 41, wherein the instructions that when executed by one or more processors results in the following additional operations including generating the CF info based, at least in part, on an application.

Example 51

This example includes the elements of example 40, wherein reducing the PT data rate includes reducing an execution rate of an application.

Example 52

This example includes the elements according to any one of examples 39 to 41, wherein the instructions that when executed by one or more processors results in the following additional operations including providing the CF info from a host CF info store to the accelerator CF info store.

Example 53

According to this example, there is provided a control flow integrity device. The device includes means for at least one of receiving and/or retrieving, by processor trace (PT) decoder circuitry, PT data from a host device; means for extracting, by the PT decoder circuitry, a target instruction pointer (TIP) packet from the PT data; means for decoding, by the PT decoder circuitry, the TIP packet to yield a runtime target address; and means for determining, by control flow integrity (CFI) checker circuitry, at runtime, whether a control flow transfer of an indirect branch instruction to the runtime target address corresponds to a control flow violation based, at least in part, on control flow (CF) information (info) stored to an accelerator CF info store included in accelerator circuitry.

Example 54

This example includes the elements of example 53, further including means for requesting, by PT feedback circuitry, that PT controller circuitry, included in the host device, reduce a PT data rate, if CFI validation operations lag behind generation of the PT data.

Example 55

This example includes the elements of example 53, further including means for translating, by the CFI checker circuitry, the runtime target address to a corresponding static target address; and means for determining, by the CFI checker circuitry, whether the static target address matches a valid target address included in the CF info.

Example 56

This example includes the elements according to any one of examples 53 to 55, wherein the PT data is received via a direct memory access to host memory circuitry.

Example 57

This example includes the elements according to any one of examples 53 to 55, wherein the PT data is received via a dedicated point-to-point interface bus.

Example 58

This example includes the elements according to any one of examples 53 to 55, wherein the indirect branch instruction is selected from the group including an indirect call, an indirect jump and a return, and the CF info includes a plurality of valid target addresses, each valid target address selected from the group including a beginning address of a function, an address of a case block for a switch case statement, a start address of a catch of a try/catch block of an exception handler, an address of a runtime function and a return address.

Example 59

This example includes the elements according to any one of examples 53 to 55, wherein the determining whether the control flow transfer to the runtime target address corresponds to the control flow violation is coarse-grained.

Example 60

This example includes the elements of example 54, further including means for requesting, by the PT feedback circuitry, dynamic reconfiguration of PT processor circuitry included in the host device.

Example 61

This example includes the elements according to any one of examples 53 to 55, wherein the CF info is organized in a data structure in the accelerator CF info store, the data structure configured to facilitate search.

Example 62

This example includes the elements of example 54, wherein at least a portion of operations of the PT decoder circuitry, the CFI checker circuitry and the PT feedback circuitry are performed in parallel.

Example 63

This example includes the elements according to any one of examples 53 to 55, wherein the accelerator circuitry is selected from the group including a graphics processing unit (GPU), a Field programmable gate array (FPGA), a complex programmable logic device (CPLD) and an application-specific integrated circuit (ASIC).

Example 64

This example includes the elements according to any one of examples 53 to 55, further including means for generating, by CF info generator circuitry, the CF info based, at least in part, on an application.

Example 65

This example includes the elements of example 54, wherein reducing the PT data rate includes reducing an execution rate of an application.

Example 66

This example includes the elements according to any one of examples 53 to 55, further including means for providing, by host CFI circuitry, the CF info from a host CF info store to the accelerator CF info store.

Example 67

According to this example, there is provided a control flow integrity system. The system includes at least one device arranged to perform the method of any one of examples 25 to 38.

Example 68

According to this example, there is provided a control flow integrity device including means to perform the method of any one of examples 25 to 38.

Example 69

According to this example, there is provided a computer readable storage device. The device has stored thereon instructions that when executed by one or more processors result in the following operations including the method according to any one of examples 25 to 38.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. Accelerator circuitry comprising:
    accelerator processor circuitry;
    accelerator memory circuitry comprising an accelerator control flow (CF) information store to receive CF information regarding an application prior to runtime of the application;
    processor trace (PT) decoder circuitry to receive PT data from a host device that is external to the accelerator circuitry, the PT decoder circuitry further to extract a target instruction pointer (TIP) packet from the PT data and to decode the TIP packet to yield a runtime target address; and
    control flow integrity (CFI) checker circuitry to determine, at runtime, whether a control flow transfer of an indirect branch instruction to the runtime target address corresponds to a control flow violation based at least in part on the CF information stored in the accelerator CF information store.

2. The accelerator circuitry of claim 1, further comprising PT feedback circuitry to request that PT controller circuitry of the host device reduce a PT data rate if CFI validation operations lag behind generation of the PT data.

3. The accelerator circuitry of claim 1, wherein the CFI checker circuitry is to translate the runtime target address to a corresponding static target address and to determine whether the static target address matches a valid target address included in the CF information.

4. The accelerator circuitry of claim 1, wherein the PT data is received via a direct memory access to host memory circuitry or a dedicated point-to-point interface bus.

5. The accelerator circuitry of claim 1, wherein the indirect branch instruction is selected from the group comprising an indirect call, an indirect jump and a return, and the CF information comprises a plurality of valid target addresses, each valid target address selected from the group comprising a beginning address of a function, an address of a case block for a switch case statement, a start address of a catch of a try/catch block of an exception handler, an address of a runtime function and a return address.

6. The accelerator circuitry of claim 1, wherein the determining whether the control flow transfer to the runtime target address corresponds to the control flow violation is coarse-grained.

7. A control flow integrity system comprising:
    a host device comprising:
        host processor circuitry to execute a target application,
        host memory circuitry,
        processor trace (PT) processor circuitry to capture PT data related to an executing application, and
        PT controller circuitry to configure the PT processor circuitry; and
    accelerator circuitry that is distinct and separate from the host device, the accelerator circuitry comprising:
        accelerator processor circuitry;
        accelerator memory circuitry that includes an accelerator control flow (CF) information store to receive CF information regarding an application prior to runtime of the application;
        processor trace (PT) decoder circuitry to receive the PT data from the host device, the PT decoder circuitry further to extract a target instruction pointer (TIP) packet from the PT data and to decode the TIP packet to yield a runtime target address; and
        control flow integrity (CFI) checker circuitry to determine, at runtime, whether a control flow transfer of an indirect branch instruction to the runtime target address corresponds to a control flow violation based at least in part on CF information stored in the accelerator CF information store.

8. The control flow integrity system of claim 7, wherein the accelerator circuitry further comprises PT feedback circuitry to request that the PT controller circuitry reduce a PT data rate, if CFI validation operations lag behind generation of the PT data.

9. The control flow integrity system of claim 8, wherein the PT feedback circuitry is further to request dynamic reconfiguration of the PT processor circuitry.

10. The control flow integrity system of claim 7, wherein the CFI checker circuitry is to translate the runtime target address to a corresponding static target address and to determine whether the static target address matches a valid target address included in the CF information.

11. The control flow integrity system of claim 7, wherein the PT data is received via a direct memory access to the host memory circuitry or a dedicated point-to-point interface bus.

12. The control flow integrity system of claim 7, wherein the indirect branch instruction is selected from the group comprising an indirect call, an indirect jump and a return, and the CF information comprises a plurality of valid target addresses, each valid target address selected from the group comprising one or more of a beginning address of a function, an address of a case block for a switch case statement, a start address of a catch of a try/catch block of an exception handler, an address of a runtime function, and a return address.

13. The control flow integrity system of claim 7, wherein the determining whether the control flow transfer to the runtime target address corresponds to the control flow violation is coarse-grained.

14. The control flow integrity system of claim 7, wherein the host device further comprises CF information generator circuitry to generate the CF information based, at least in part, on the application.

15. A control flow integrity method comprising:
receiving, by processor trace (PT) decoder circuitry included within accelerator circuitry, PT data from a host device that is external to the accelerator circuitry;
extracting, by the PT decoder circuitry, a target instruction pointer (TIP) packet from the PT data;
decoding, by the PT decoder circuitry, the TIP packet to yield a runtime target address; and
determining, by control flow integrity (CFI) checker circuitry at runtime, whether a control flow transfer of an indirect branch instruction to the runtime target address corresponds to a control flow violation based at least in part on control flow (CF) information stored prior to runtime by an accelerator CF information store included in the accelerator circuitry.

16. The method of claim 15, further comprising requesting, by PT feedback circuitry, that PT controller circuitry, included in the host device, reduce a PT data rate, if CFI validation operations lag behind generation of the PT data.

17. The method of claim 16, wherein at least a portion of operations of the PT decoder circuitry, the CFI checker circuitry and the PT feedback circuitry are performed in parallel.

18. The method of claim 15, further comprising translating, by the CFI checker circuitry, the runtime target address to a corresponding static target address; and determining, by the CFI checker circuitry, whether the static target address matches a valid target address included in the CF information.

19. The method of claim 15, wherein the PT data is received via a direct memory access to host memory circuitry or a dedicated point-to-point interface bus.

20. The method of claim 15, wherein the indirect branch instruction is selected from the group comprising an indirect call, an indirect jump and a return, and wherein the CF information comprises a plurality of valid target addresses, each valid target address selected from the group comprising a beginning address of a function, an address of a case block for a switch case statement, a start address of a catch of a try/catch block of an exception handler, an address of a runtime function, and a return address.

21. The method of claim 15, wherein the CF information is organized in a data structure in the accelerator CF information store, the data structure configured to facilitate search.

22. The method of claim 15, further comprising generating, by CF information generator circuitry, the CF information based at least in part on an application.

* * * * *